(12) United States Patent
Svennung

(10) Patent No.: US 8,826,546 B2
(45) Date of Patent: Sep. 9, 2014

(54) CUTTING ASSEMBLY FOR HAND-HELD POWER TOOL

(75) Inventor: Johan Svennung, Jönköping (SE)

(73) Assignee: Husqvarna AB, Huskvarna (SE)

( * ) Notice: Subject to any disclaimer, the term of this patent is extended or adjusted under 35 U.S.C. 154(b) by 68 days.

(21) Appl. No.: 13/392,684

(22) PCT Filed: Sep. 1, 2009

(86) PCT No.: PCT/SE2009/050984
§ 371 (c)(1),
(2), (4) Date: Feb. 27, 2012

(87) PCT Pub. No.: WO2011/028156
PCT Pub. Date: Mar. 10, 2011

(65) Prior Publication Data
US 2012/0151778 A1    Jun. 21, 2012

(51) Int. Cl.
*A01G 3/053*    (2006.01)
*B26B 15/00*    (2006.01)

(52) U.S. Cl.
CPC ..................... *A01G 3/053* (2013.01)
USPC ................. 30/216; 83/223; 83/215

(58) Field of Classification Search
USPC ........... 30/216, 223, 215, 266, 220, 208, 228, 30/369, 224, 210; 74/49, 50, 567, 570, 74/440, 89.16, 594.2; 83/837; 56/236, 56/13.6, 17.6, 297; 411/432, 533, 368, 411/388, 366.1, 367
See application file for complete search history.

(56) References Cited

U.S. PATENT DOCUMENTS

| 2,042,902 | A | * | 6/1936 | Kulikowski | 30/211 |
| 2,293,637 | A | * | 8/1942 | Bourque | 30/216 |
| 2,748,477 | A | * | 6/1956 | Smith | 30/208 |
| 5,138,908 | A |   | 8/1992 | Raetz et al. |  |
| 5,689,887 | A | * | 11/1997 | Heywood et al. | 30/220 |
| 7,406,770 | B2 | * | 8/2008 | Mace et al. | 30/216 |

FOREIGN PATENT DOCUMENTS

| EP | 0635200 | 1/1995 |
| JP | 2002305967 | 10/2002 |
| JP | 2006333799 | 12/2006 |

OTHER PUBLICATIONS

International Search Report and Written Opinion of PCT/SE2009/050984.
Chapter II International Preliminary Report on Patentability of PCT/SE2009/050984.

* cited by examiner

*Primary Examiner* — Ghassem Alie
(74) *Attorney, Agent, or Firm* — Nelson Mullins Riley & Scarborough LLP

(57) ABSTRACT

A cutting assembly for a portable hand-held power driven working tool may include a first elongate cutting blade and a second elongate cutting blade. The cutting blades are arranged to be connected to a gear, causing the cutting blades to move in a reciprocal manner along a longitudinal axis of the cutting blades. The cutting blades are arranged to be mounted so that an interior surface of the first cutting blade faces towards and abuts on an interior surface of the second cutting blade. At least one of the cutting blades has a recess extending in a longitudinal portion of the interior surface of the cutting blades, such that a gap appears between the cutting blades when they are mounted in a face-to-face relationship. The gap prevents the flow of the grease from the gearbox beyond the position of the gap on the cutting assembly.

13 Claims, 3 Drawing Sheets

CUTTING ASSEMBLY FOR HAND-HELD POWER TOOL

TECHNICAL FIELD

The present invention relates to hand-held power driven working tools, and more particularly, to a cutting assembly for hand-held power driven working tools, such as a hedge trimmer.

BACKGROUND

A portable power tool, such as a hedge trimmer, typically uses a driving mechanism that transmits the power generated by an electric/battery operated motor or an internal combustion engine to a cutting assembly through a gearbox. The portable trimmer may be operated by a clutch, which in turn controls the power from the motor/engine, and thereby drives the cutting assembly through a clutch drum to perform trimming work. The cutting assembly of a portable hedge trimmer includes one or more cutting blades which may move relative to each other to perform the cutting operation.

The gearbox is lubricated by pumping one or more strokes of grease. However, over-lubrication may cause the gearbox to run slower than normal, and may also cause a leakage in the form of excess grease that flows out from the gearbox onto the cutting assembly. This may lead the cutting blades in the cutting assembly to stick tight with each other when the trimmer is not in an operational state. This may lead to operational problems, such as jamming of the clutch, during subsequent operation of the trimmer. Further, this may also lead to excessive energy consumption in battery powered tools. Moreover, this may pose problems in assembling and disassembling of the trimmer system for inspection or fixing purposes.

Thus, during operation of the trimmer, it is required to inhibit the cutting blades from sticking to each other. Therefore, there is a need for an improved portable power tool, which provides a means for preventing the flow of grease from the gearbox onto the cutting assembly.

SUMMARY

In view of the above, it is an objective to solve or at least reduce the problems discussed above. In particular, an objective is to provide an improved cutting assembly for a portable hand-held power working tool that solves the problem of grease outflow from the gearbox to the cutting assembly and further onto the cutting blades.

This is achieved with novel cutting blades according to the preamble of claim 1, in which at least one of the cutting blades of the cutting assembly has a recess extending in a portion of the interior surface such that a gap appears between the cutting blades when they are mounted in a face to face relationship. The cutting blades include a first elongate cutting blade and a second elongate cutting blade wherein the cutting blades are arranged to be mounted such that an interior surface of the first cutting blade faces towards and abuts on an interior surface of the second cutting blade. The gap that appears between the cutting blades helps in preventing the outflow of grease from the gearbox onto the cutting assembly and further onto the cutting blades. In an aspect of the invention, the gap provides a region of no-friction zone (air-gap), which does not allow the grease to move beyond the positioning of the gap in the cutting assembly. Moreover, the presence of the air-gap is beneficial as it inhibits the cutting blades from sticking to each other, and thus provides improved performance.

According to claim 2, the cutting blades are connected to a gearbox. In an aspect of the invention, the gearbox provides functionality which allows the cutting blades to move in a reciprocal manner along a longitudinal axis of the cutting blades.

According to claim 3, the length of the recesses in the cutting blades that defines the length of the gap is at least equal to a length of a stroke of a reciprocating cutting blade. In an aspect of the invention, when one of the cutting blades slides over the other, the distance travelled by the cutting blades longitudinally is less than or at least equal to the length of the gap which ensures that grease does not flow beyond the gap and further out along the cutting blades. In another aspect of the invention, the optimal length of the gap in order to prevent the outward flow of grease further onto the cutting blades may depend based at least in part on the gearbox used, the length of the reciprocating stroke of the cutting blades and the type of cutting blades used.

According to claim 4, the gearbox is coupled to a battery operated motor system for driving the cutting assembly. Since, the recesses in the cutting blades prevent the flow of grease onto the cutting blades, the energy consumption of the battery operated motor reduces to a great extent.

According to claim 5, the gearbox can derive power from an internal combustion engine. In an aspect of the invention, the need of the power is based at least in part on one or more applications of the hand-held power driven working tool.

Further, the recess provided in the cutting blades can be of any shape and may provide the same desired results. In various aspects of the invention, the shape of the recess can be truncated pyramid, rectangular or elliptical, according to preamble of claims 6, 7 and 8 respectively.

According to claim 9, the gap is positioned based at least in part on the type of gearbox used, and the nature and configuration of the cutting blades used in the cutting assembly. In an aspect of the invention, in order to improve the performance of the cutting assembly 4 of the power tool, the recesses may be flexibly positioned along a range of distances from the gear box and outward towards the cutting assembly. In an advantageous aspect of the invention, the recesses may be longitudinally positioned between the inner end of the cutting blades attached to the gearbox and a first tooth of the cutting blades, according to the preamble of claim 10.

According to claim 11, in various aspects of the invention, the hand-held power driven working tool can be a hedge trimmer, which employs all the advantageous aspects of the invention.

BRIEF DESCRIPTION OF THE DRAWINGS

The invention will in the following be described in more detail with reference to the enclosed drawings, wherein.

DESCRIPTION OF EMBODIMENTS

Figure 1:
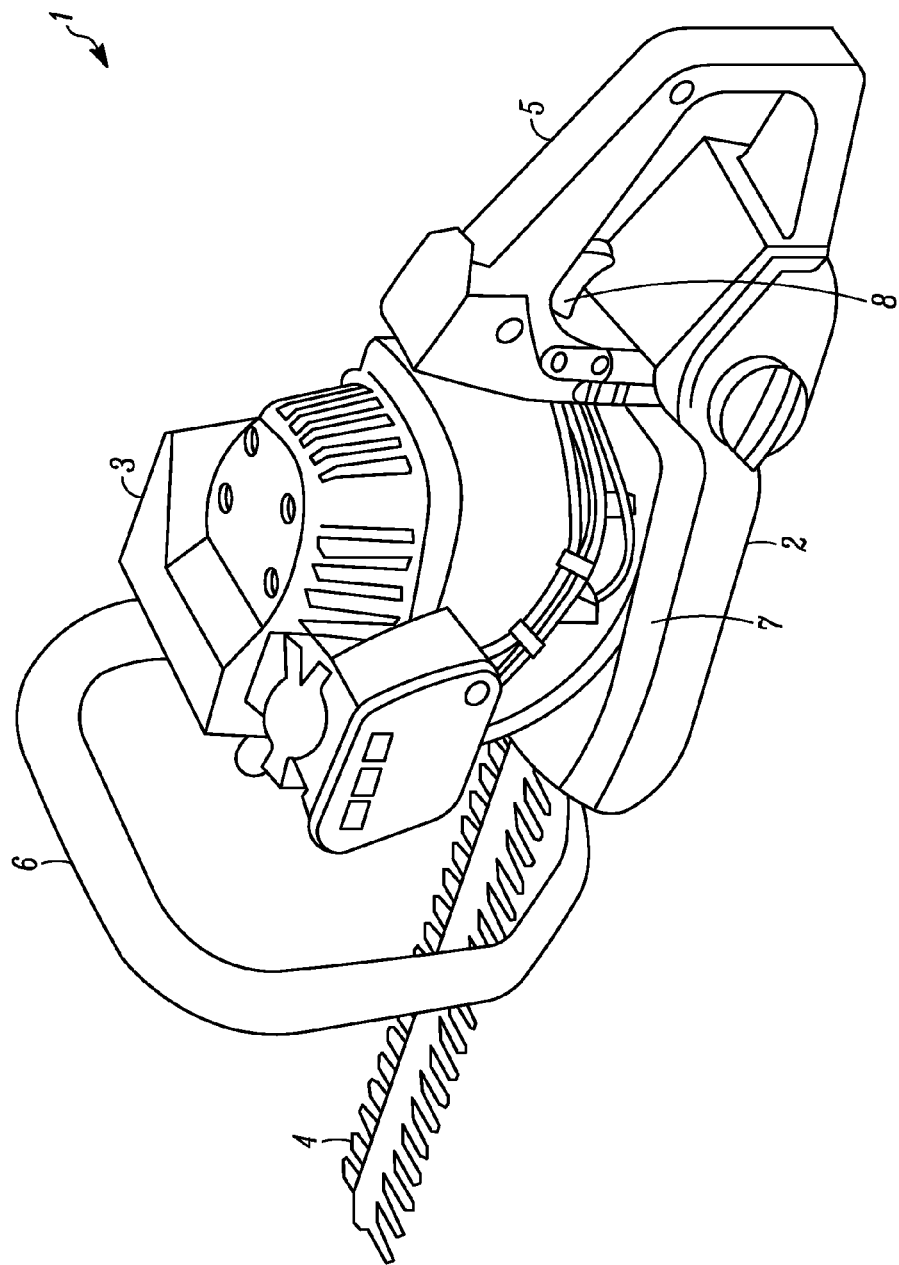
FIG. 1 shows a perspective view of an example hand-held powered hedge trimmer incorporating some aspects of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIG. 1 shows a perspective view of an example hand-held powered hedge trimmer 1 incorporating some aspects of the present invention. Garden hedges, generally cut with a knife or with pruning shears, may be trimmed with a hand-held powered hedge trimmer 1 as shown in FIG. 1. Although the described example in FIG. 1 is a hedge trimmer, it should be understood that the present invention could be incorporated into any suitable type of power tool or hand-held power driven working tool and is not limited to use merely in a hedge trimmer and, may be incorporated in different types of embodiments. In addition, any suitable size, shape or type of elements or materials could be used.

The hedge trimmer 1 as shown in the FIG. 1 includes a base portion or a frame 2, an engine 3 connected to the frame 2 and a cutting assembly 4. The frame 2 can be made of metal, plastic, or the like. In one example embodiment of the present invention, the cutting assembly 4 includes a pair of double-sided reciprocating cutting blades. The hedge trimmer 1 having double-sided blades operates with a scissor-like action in which the cutting edges of sharpened teeth projecting laterally from the pair of cutting blades move back and forth in opposite directions. The opposing reciprocation of the cutting teeth causes the teeth to first move apart to create an opening between the teeth in which the hedge materials enter and then they move together to sever those materials. Additionally different embodiments of the present invention may involve a hedge trimmer having a blade with teeth spaced from each other on at least two different spacing (not shown in figure). One set of the blade teeth is spaced according to the usual branch size, while a second set of the teeth is spaced according to a larger branch size. Such an arrangement allows the hedge trimmer to accommodate a variety of branch sizes. However, various other embodiments of the present invention may employ various other blade configurations, with different number of cutting blades.

As shown in the FIG. 1, the frame 2 includes a rear handle 5 and a front handle 6. In an embodiment of the present invention, the hedge trimmer 1 may further have safety features which allow operation of the hedge trimmer 1 only when both of the operator's hands are engaged with respect to the rear handle 5 and the front handle 6. Further, in an exemplary embodiment of the present invention, the hedge trimmer 1 is driven by an engine 3, which is coupled to a drive assembly (not shown) for operating the cutting assembly 4 of the hedge trimmer 1. Further, the engine 3 is in operative connection with a gearbox 7, configured to transfer power from the engine 3 to drive the cutting assembly 4. The hedge trimmer 1 has a throttle device, attached to the frame 2, which has a throttle trigger 8 attached to the rear handle 5, and a clutch (not shown in figure) located in the frame 2 that connects the engine 3 to the cutting assembly 4. The throttle trigger 8 is generally biased in a home position or a relatively lower motor speed position via a trigger spring (not shown). The trigger spring is typically a coiled spring located in the rear handle 5. However, various embodiments of the invention may employ a battery operated motor to power the hedge trimmer 1.

The gearbox 7, which controls the operation of the hedge trimmer 1, may include a housing (not shown in figure) fixedly attached to the frame 2. The housing may be attached to the frame 2 by means of fasteners extending through mounting holes (not shown in figure). This arrangement facilitates engaging and disengaging of the housing to remove the gearbox 7 for maintenance and/or replacement of elements within the gearbox 7. The gearbox 7 further includes one or more main gears, and drive gears (not shown in figure). Examples of gears in the gearbox 7 include, but may not be limited to, spur gears, helical gears, bevel gears, worm gears, crown gears, differential gears or planetary gears. The one or more drive gears may be coupled to a power transfer device (not shown in figure) which may either be directly connected to the output of the engine 3, such as a connection to an engine crankshaft, or may be indirectly connected to the engine 3, such as through gearing or the like for modifying speed and/or torque and/or a clutch device or the like.

Figure 2:
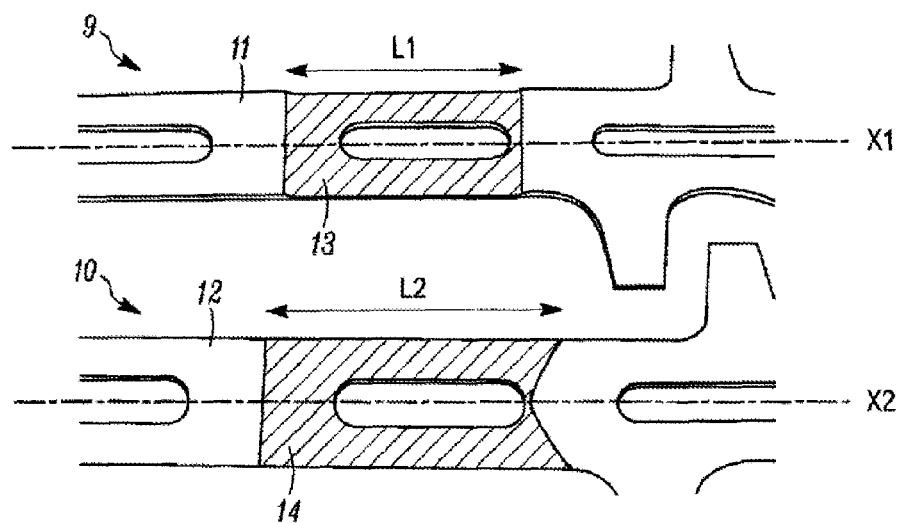
FIG. 2 shows example cutting blades employed in a cutting assembly of a portable hand-held power driven working tool, in accordance with an embodiment of the present invention.

FIG. 2 shows a pair of example cutting blades forming the cutting assembly 4, and employed in the hand-held hedge trimmer 1, in accordance with an embodiment of the invention. As shown in the FIG. 2, the cutting blades include: a first elongate cutting blade 9 and a second elongate cutting blade 10. The figure further shows an interior surface 11 of the first cutting blade 9, and an interior surface 12 of the second cutting blade 10. In an exemplary embodiment of the present invention, at least one of the first cutting blade 9 and the second cutting blade 10 has a recess extending in the portion of their interior surfaces 11, 12. For example, as shown in the FIG. 2, a portion of the interior surface 11 of the first cutting blade 9 is milled along the longitudinal axis (X1) of the first cutting blade 9 to provide a first recess 13 of length "L1". Similarly, a portion of the interior surface 12 of the second cutting blade 10 is milled along the longitudinal axis (X2) of the second cutting blade 10 to provide a second recess 14 of length "L2". In an embodiment of the present invention, the first and second recesses 13, 14 may be provided in any desired shape, for example, truncated pyramid, rectangular, elliptical etc. Since, at least one of the interior surfaces 11, 12 of the first and second cutting blade 9, 10 have a recess, a gap is formed when the interior surface 11 of the first cutting blade 9 faces towards and abuts on the interior surface 12 of the second cutting blade 10.

Figure 3:
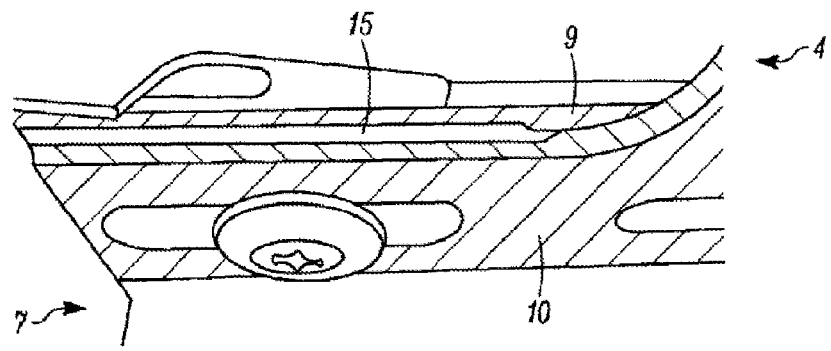
FIG. 3 shows an example arrangement of the cutting blades for the hand-held power driven working tool, in accordance to an embodiment of the invention.

FIG. 3 shows an example arrangement of the cutting blades 9, 10 for the portable hand-held power-driven hedge trimmer 1, in accordance to an embodiment of the invention. As shown in the FIG. 3, the interior surface 11 of the first cutting blade 9 faces towards and abuts on the interior surface 12 of the second cutting blade 10 and thus creates a gap 15 between the first cutting blade 9 and the second cutting blade 10. In an exemplary embodiment of the present invention, the first cutting blade 9 and the second cutting blade 10 are clamped to the gearbox 7 of the hedge trimmer 1 (shown in FIG. 1). The operation of the hedge trimmer 1 is governed by the reciprocating motion of the first cutting blade 9 and the second cutting blade 10 where the cutting blades 9, 10 slide past each other to perform shearing-type cutting action. In other words, the first cutting blade 9 and the second cutting blade 10 are arranged to be connected to the gearbox 7 such that the cutting blades move in a reciprocal manner along the longitudinal axis (X1, X2) of the cutting blades 9, 10 respectively.

Further, the gearbox 7 of the hedge trimmer 1 is lubricated by pumping one or more strokes of grease. However, due to reciprocating motion of the cutting blades 9, 10 the grease may flow out from the gearbox 7 onto the cutting assembly 4 and further onto the cutting blades 9, 10. In an embodiment of the present invention, the gap 15 created by the recesses 13, 14 on the interior surfaces 11, 12 of the first cutting blade 9 and the second cutting blade 10 respectively, prevents the outward flow of the grease. Since, the recesses 13, 14 form a region of air-gap between the cutting blades 9, 10, the flow of grease stops on reaching the gap 15, as there is no friction to support the flow of grease further out onto the cutting blades 9, 10. Also, the length of the cutting blades 9, 10 between the gearbox 7 and the gap 15 on the cutting assembly 4, gets saturated with grease which reduces friction to an extent that the flow of grease into the recesses 13, 14 and further out onto the cutting blades 9, 10 gets inhibited.

In an embodiment of the present invention, the lengths (L1, L2) of the recesses 13, 14 of the cutting blades 9,10 that define the length of the gap 15 is at least equal to or greater then the length of a reciprocating stroke of the cutting assembly 4. Thus, when one of the cutting blades 9, 10 slides over the other, the distance traveled by the cutting blades 9, 10 longitudinally is less than or at least equal to the length of the gap 15, which ensures that grease does not flow beyond the gap 15 and further out along the cutting blades 9, 10. In various embodiments of the present invention, the optimal length of the gap 15 in order to prevent the outward flow of grease further onto the cutting blades 9, 10 may depend based at least in part on the gearbox 7 used, the length of the reciprocating stroke of the cutting blades 9, 10 and the type of cutting blades 9, 10 used.

Figure 4:
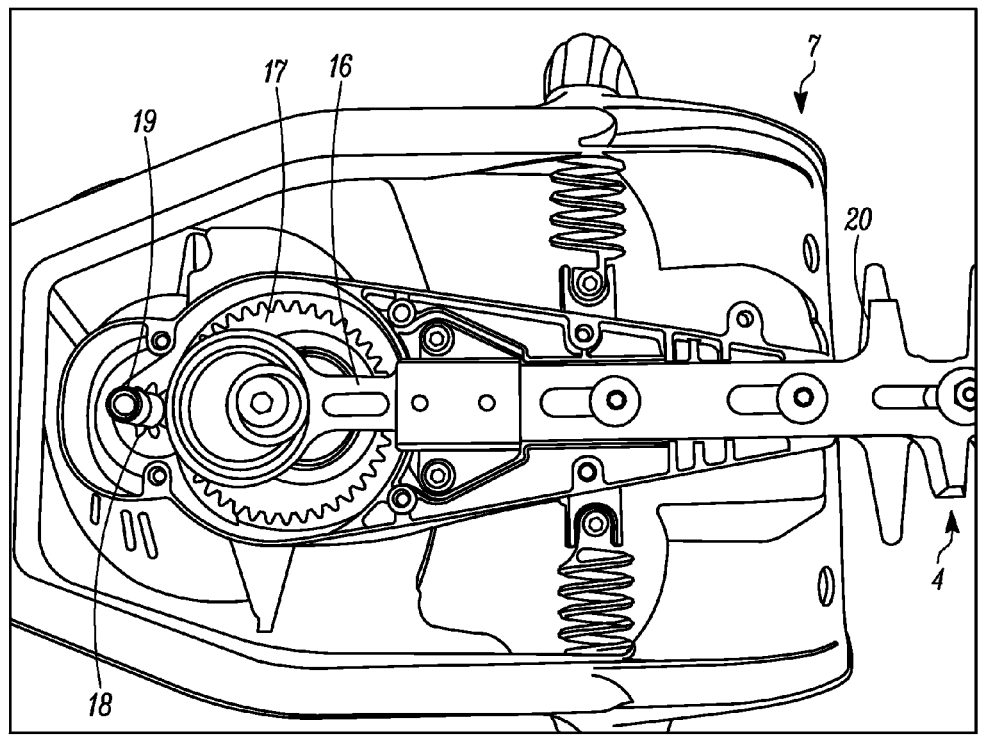
FIG. 4 shows an exemplary embodiment illustrating a positioning of recesses in the cutting assembly, in accordance with an embodiment of the invention.

FIG. 4 shows an exemplary embodiment illustrating the positioning of the recesses 13, 14, in accordance with an embodiment of the invention. As shown in FIG. 4, an inner end 16 of the cutting assembly 4 is coupled to a main gear 17 through a cam (not shown in figure). Further, a drive gear 18 is engaged to the main gear 17 to drive the main gear 17. The drive gear 18 is either mounted to or formed on a drive shaft 19, which is connected to a power transfer device (not shown in figure).

Additionally, in order to optimize the performance of the cutting assembly 4 of the power tool, the recesses 13, 14 (shown in the FIG. 2) may be flexibly positioned along a range of distances from the gear box 7 and outward towards the cutting assembly 4. In one example embodiment of the present invention, the recesses 13, 14 may be longitudinally positioned between the inner end 16 of the cutting blades 9, 10 attached to the gearbox 7 and a first tooth 20 of the cutting blades 9, 10. However, the optimal position of the recesses 13, 14 may depend based at least in part on the type of gearbox, and the nature and configuration of the cutting blades 9, 10.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A cutting assembly for a portable hand-held power-driven working tool, the cutting assembly comprising
   a first elongate cutting blade, and
   a second elongate cutting blade,
   wherein the cutting blades are arranged to be mounted such that an interior surface of the first cutting blade faces towards and abuts on an interior surface of the second cutting blade,
   wherein at least one of the cutting blades has a recess extending in a portion of the interior surface such that a gap appears between the interior surfaces of the first and second cutting blades when they are mounted in a face-to-face relationship,
   wherein the cutting blades are arranged to move in a reciprocal manner in relation to each other along a longitudinal axis of the cutting blades,
   wherein a length of the gap in the axial direction of the cutting assembly, is at least equal to a length of a reciprocating stroke of the cutting assembly, and
   wherein the recess extends in a transverse direction over an entirety of a width of a portion of the at least one of the cutting blades corresponding to the recess, such that the width of the portion of the at least one of the cutting blades corresponding to the recess extends from one end edge side of the at least one of the cutting blades to an opposite end edge side of the at least one of the cutting blades.

2. The cutting assembly according to claim 1, wherein the cutting blades are arranged to be connected to a gearbox, causing the reciprocal movement of the cutting blades along the longitudinal axis of the cutting blades.

3. The cutting assembly according to claim 2, wherein the gearbox is coupled to a battery operated motor to power the cutting assembly.

4. The cutting assembly according to claim 2, wherein the gearbox is coupled to an internal combustion engine to power the cutting assembly.

5. The cutting assembly according to claim 1, wherein the shape of the recess is rectangular.

6. The cutting assembly according to claim 1, wherein the gap is positioned ahead of a first tooth of the cutting blades.

7. A hand-held, power-driven, cutting device comprising a cutting assembly including:
   a first elongate cutting blade, and
   a second elongate cutting blade,
   wherein the cutting blades are arranged to be mounted such that an interior surface of the first cutting blade faces towards and abuts on an interior surface of the second cutting blade,
   wherein at least one of the cutting blades has a recess extending in a portion of the interior surface such that a gap appears between the interior surfaces of the first and second cutting blades when they are mounted in a face-to-face relationship,
   wherein the cutting blades are arranged to move in a reciprocal manner in relation to each other along a longitudinal axis of the cutting blades,
   wherein a length of the gap in the axial direction of the cutting assembly, is at least equal to a length of a reciprocating stroke of the cutting assembly, and
   wherein the recess extends in a transverse direction over an entirety of a width of a portion of the at least one of the cutting blades corresponding to the recess, such that the width of the portion of the at least one of the cutting blades corresponding to the recess extends from one end edge side of the at least one of the cutting blades to an opposite end edge side of the at least one of the cutting blades.

8. The cutting device according to claim 7, wherein the cutting blades are arranged to be connected to a gearbox, causing the reciprocal movement of the cutting blades along the longitudinal axis of the cutting blades.

9. The cutting device according to claim 8, wherein the gearbox is coupled to a battery operated motor to power the cutting assembly.

10. The cutting device according to claim 8, wherein the gearbox is coupled to an internal combustion engine to power the cutting assembly.

11. The cutting device according to claim 7, wherein the shape of the recess is rectangular.

12. The cutting device according to claim 7, wherein the gap is positioned ahead of a first tooth of the cutting blades.

13. The cutting device according to claim 7, wherein the cutting device is a hedge trimmer.

\* \* \* \* \*